United States Patent
Hu et al.

(10) Patent No.: US 11,623,111 B2
(45) Date of Patent: Apr. 11, 2023

(54) RESCUE ROBOT AND METHOD FOR SEARCHING TRAPPED PERSONS FOR FIREFIGHTING

(71) Applicant: North China Institute of Science and Technology, Langfang (CN)

(72) Inventors: Xingzhi Hu, Langfang (CN); Han Hu, Langfang (CN)

(73) Assignee: NORTH CHINA INSTITUTE OF SCIENCE AND TECHNOLOGY, Langfang (CN)

( * ) Notice: Subject to any disclaimer, the term of this patent is extended or adjusted under 35 U.S.C. 154(b) by 114 days.

(21) Appl. No.: 17/397,205

(22) Filed: Aug. 9, 2021

(65) Prior Publication Data

US 2022/0143441 A1    May 12, 2022

(30) Foreign Application Priority Data

Nov. 9, 2020   (CN) .......................... 202011239879.7

(51) Int. Cl.
| | | |
|---|---|---|
| A62C 31/28 | (2006.01) | |
| A62C 31/02 | (2006.01) | |
| B25J 5/00 | (2006.01) | |
| B25J 9/00 | (2006.01) | |
| B25J 15/02 | (2006.01) | |

(52) U.S. Cl.
CPC .............. *A62C 31/28* (2013.01); *A62C 31/02* (2013.01); *B25J 5/007* (2013.01); *B25J 9/0087* (2013.01); *B25J 15/0253* (2013.01)

(58) Field of Classification Search
CPC .......... A62C 31/02; A62C 31/28; B25J 5/007; B25J 9/0087; B25J 15/0253
See application file for complete search history.

(56) References Cited

U.S. PATENT DOCUMENTS

| | | | |
|---|---|---|---|
| 2016/0113728 A1* | 4/2016 | Piron ..................... | A61B 34/30 606/130 |
| 2017/0143429 A1* | 5/2017 | Richmond ............. | A61B 34/37 |
| 2018/0001476 A1* | 1/2018 | Tan ......................... | B61G 7/04 |
| 2019/0216555 A1* | 7/2019 | DiMaio ................. | A61B 50/13 |

\* cited by examiner

*Primary Examiner* — Saul Rodriguez
*Assistant Examiner* — Brendan P Tighe
(74) *Attorney, Agent, or Firm* — The Small Patent Law Group LLC; Christopher R. Carroll

(57) ABSTRACT

Disclosed is a rescue robot for searching trapped persons for firefighting, including a mobile base. Mobile rollers with self-locking mechanisms are mounted at a bottom of the mobile base, a machine mounting seat is fixed to the mobile base, a rotating column is arranged at the top of the machine mounting seat, a driving motor is mounted at a bottom of an inner cavity of the machine mounting seat, a right output end of the driving motor is sleeved with a driving bevel gear, a bottom of the rotating column penetrates through a top of the machine mounting seat and is sleeved with a driven bevel gear, the driving bevel gear and the driven bevel gear are mutually meshed, a portion of an outer wall of the rotating column is fixedly sleeved with a fixed seat, left and right sides of the fixed seat are symmetrical bridge cranes.

6 Claims, 2 Drawing Sheets

RESCUE ROBOT AND METHOD FOR SEARCHING TRAPPED PERSONS FOR FIREFIGHTING

CROSS REFERENCE TO RELATED APPLICATION(S)

This patent application claims the benefit and priority of Chinese Patent Application No. 202011239879.7, filed on Nov. 9, 2020, the disclosure of which is incorporated by reference herein in its entirety as part of the present application.

TECHNICAL FIELD

The present disclosure relates to the field of rescue robot processing, and in particular relates to a rescue robot and method for searching trapped persons for firefighting.

BACKGROUND ART

Nowadays, due to complexed living environment, fires will cause huge losses if they are not extinguished promptly. Sometimes, the conditions of fires are complicated, and thus the fires are more difficult to be extinguished manually by firefighters. With adoption of firefighting robots to assist firefighters in fire extinguishing for dealing with hard-to-extinguish points, dangerous cases and casualties can be effectively reduced. Therefore, for locations that are difficult for firefighters to reach or have a high risk on the scene of fire, the firefighting robots can be used. In China, research on the firefighting robots began in the late 1980s. Shanghai Fire Research Institute and others have made remarkable achievements in the research of firefighting robots. "Self-propelled monitors" are already available on the market, and "crawler fire searching robots" have also passed the national acceptance. However, the firefighting robots in China is still at an initial stage, and there are still many problems that need to be further improved and intensively studied.

As for existing firefighting rescue, firefighters usually manually move stones and beam columns above trapped persons away during search and rescue, and requires a huge amount of manual labor when encountering larger stones and beam columns. Moreover, the stones and beam columns may fall off during carrying, causing injury to the trapped persons, and when there is an open fire burning in rescue places, the fire cannot be extinguished immediately, causing the expansion of the fire.

SUMMARY

The present disclosure aims to overcome the above-mentioned problems in the prior art and provides a rescue robot for searching for trapped persons for firefighting.

In order to achieve the above-mentioned technical objectives and achieve the above-mentioned technical effects, the present disclosure is implemented through the following technical solution:

Disclosed is a rescue robot for searching trapped persons for firefighting, including a mobile base. Mobile rollers with self-locking mechanisms are mounted at a bottom of the mobile base, a machine mounting seat is fixed to the mobile base, a rotating column is arranged at the middle of a top of the machine mounting seat, a driving motor is mounted at a bottom of an inner cavity of the machine mounting seat, a right output end of the driving motor is sleeved with a driving bevel gear, a bottom of the rotating column penetrates through a top of the machine mounting seat and is sleeved with a driven bevel gear, the driving bevel gear and the driven bevel gear are mutually meshed, a portion of an outer wall of the rotating column above the machine mounting seat is fixedly sleeved with a fixed seat, left and right sides of the fixed seat are symmetrical bridge cranes, rotating shaft seats are mounted at one sides of the two sets of bridge cranes that are far away from each other, first power arms are mounted on the other sides of the two sets of rotating shaft seats, second power arms are rotatably connected to the other sides of the two sets of first power arms through rotating bearings, first hydraulic telescopic rods are fixed to bottom side walls of the second power arms, the other ends of the first hydraulic telescopic rods abut against and fixed to the rotating shaft seats, hoisting booms are rotatably connected to the other ends of the second power arms through rotating bearings, second hydraulic telescopic rods are fixed to top side walls of the hoisting booms, the other ends of the second hydraulic telescopic rods are fixed to top side walls of the second power arms, and rescue clamping mechanisms are fixed to the hoisting booms.

Preferably, the rescue clamping mechanism includes a first rescue gripper and a second rescue gripper, a gripper mounting seat is mounted on tops of the first rescue gripper and the second rescue gripper, a top of the gripper mounting seat is fixedly connected to a bottom of the hoisting boom, a sliding groove is arranged at a bottom of the gripper mounting seat, a mobile slider slidably connected to the sliding groove is fixed to the tops of the first rescue gripper and the second rescue gripper, and the first rescue gripper and the second rescue gripper are fixedly connected to each other through a third hydraulic telescopic rod.

Preferably, opposite end side walls of the first rescue gripper and the second rescue gripper are sleeved with non-slip rubber spacers.

Preferably, a water tank is fixed to a top of the machine mounting seat and located at a right side of the rotating column, a water guiding hose is inserted into and communicated with a bottom of a right end side wall of the water tank, the other end of the water guiding hose is sleeved with a spray head, and a water stop valve and a water pump are mounted on the water guiding hose respectively.

Preferably, a protective baffle is fixed to a top of the rotating column.

BENEFICIAL EFFECTS

The rescue robot is moved to a designated rescue location through the mobile rollers. When carrying stones or beam columns, the driving motor is started. The driving motor drives the driving bevel gear to rotate. Due to the fact that the driving bevel gear and the driven bevel gear are mutually meshed, the rotating column is then driven by the driven bevel gear to adjust the angle and the direction of the rescue clamping mechanism to adjust the rescue clamping mechanism to the direction the same as a desired place. Afterwards, angles and positions of the first power arm and the second power arm are adjusted by the first hydraulic telescopic rod and the second hydraulic telescopic rod, and then the rescue clamping mechanism is driven to lower and move by the hosting boom at the bottom, so that the stones or beam columns to be carried are located between the first rescue gripper and the second rescue gripper. The third hydraulic telescopic rod is controlled to cause the first rescue gripper and the second rescue gripper at left and right sides thereof to close to each other to clamp and fix the stones and beam columns above a trapped person, and then the first power arm and the second power arm are driven by the first hydraulic telescopic rod and the second hydraulic telescopic rod to carry the stones and beam columns away. If there is still an open fire burning in the trapped area, the water stop valve is opened, the water pump is started, and the spray head is directed at a burning point to spray and extinguish the fire to prevent the fire from spreading further.

Of course, any product implementing the present disclosure does not necessarily need to achieve all the above-mentioned advantages at the same time.

BRIEFT DESCRIPTION OF THE DRAWINGS

In order to illustrate the technical solutions in the embodiments of the present disclosure more clearly, the drawings that need to be used in the descriptions of the embodiments will be briefly introduced below. Obviously, the drawings in the following descriptions are merely some embodiments of the present disclosure. For a person of ordinary skill in the art, other drawings may be obtained according to these drawings without creative work.

1—mobile base, 2—mobile roller, 3—machine mounting seat, 4—rotating column, 5—driving motor, 6—driving bevel gear, 7—driven bevel gear, 8—fixed seat, 9—bridge crane, 10—rotating shaft seat, 11—first power arm, 12—second power arm, 13—first hydraulic telescopic rod, 14—hoisting boom, 15—second hydraulic telescopic rod, 16—rescue clamping mechanism, 1601—first rescue gripper, 1602—second rescue gripper, 1603—gripper mounting seat, 1604—sliding groove, 1605—mobile slider, 1606—third hydraulic telescopic rod, 17—non—slip rubber spacer, 18—water tank, 19—water guiding hose, 20—spray head, 21—water stop valve, 22—water pump, and 23—protective baffle.

DETAILED DESCRIPTION OF THE EMBODIMENTS

The technical solutions in the embodiments of the present disclosure will be clearly and completely described below with reference to the accompanying drawings in the embodiments of the present disclosure. Obviously, the embodiments described are merely a part of the embodiments of the present disclosure, not all the embodiments. Based on the embodiments of the present disclosure, all other embodiments obtained by a person of ordinary skill in the art without creative work shall fall within the protection scope of the present disclosure.

Figure 1:
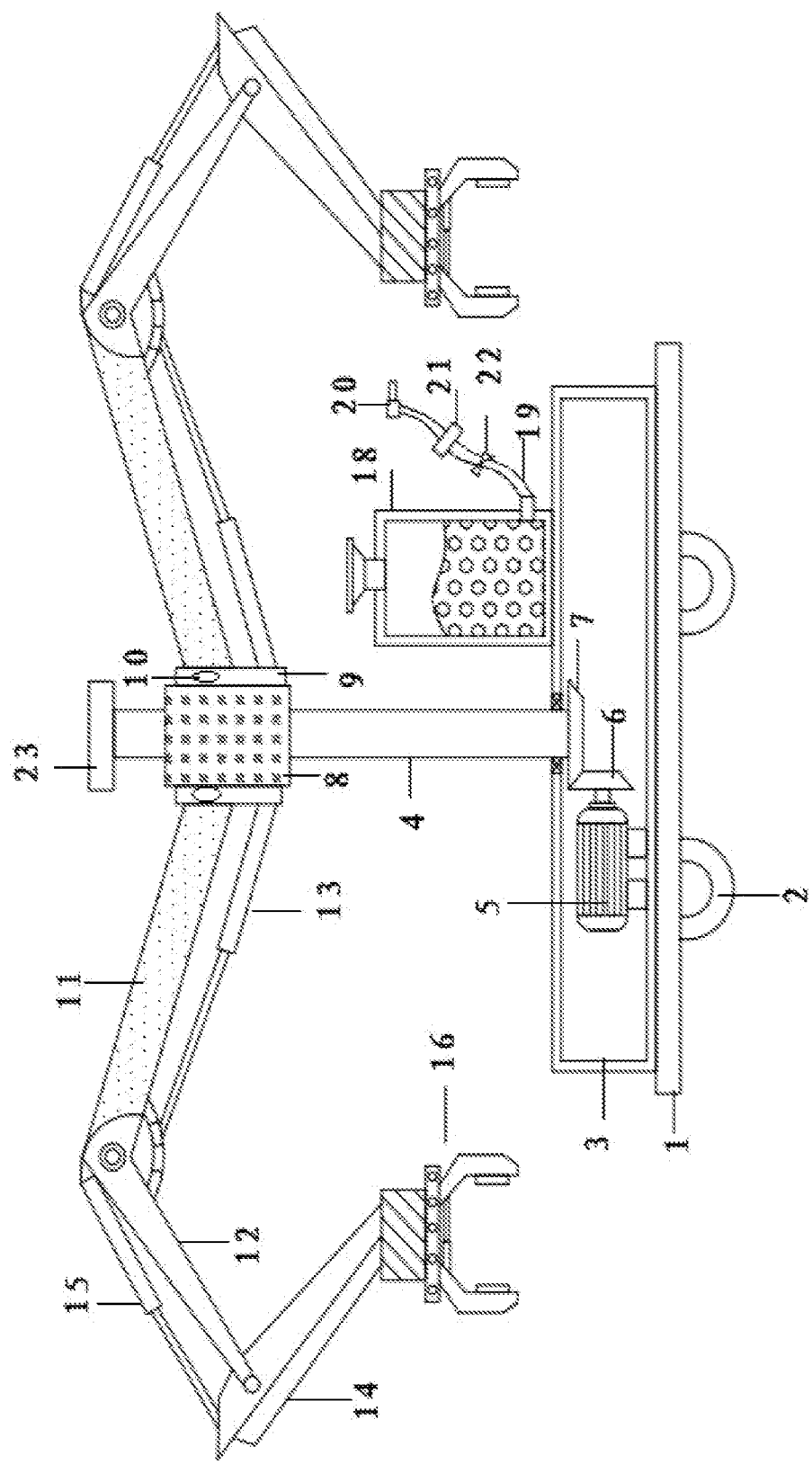
FIG. 1 is a schematic structural diagram of the present disclosure.
Figure 2:
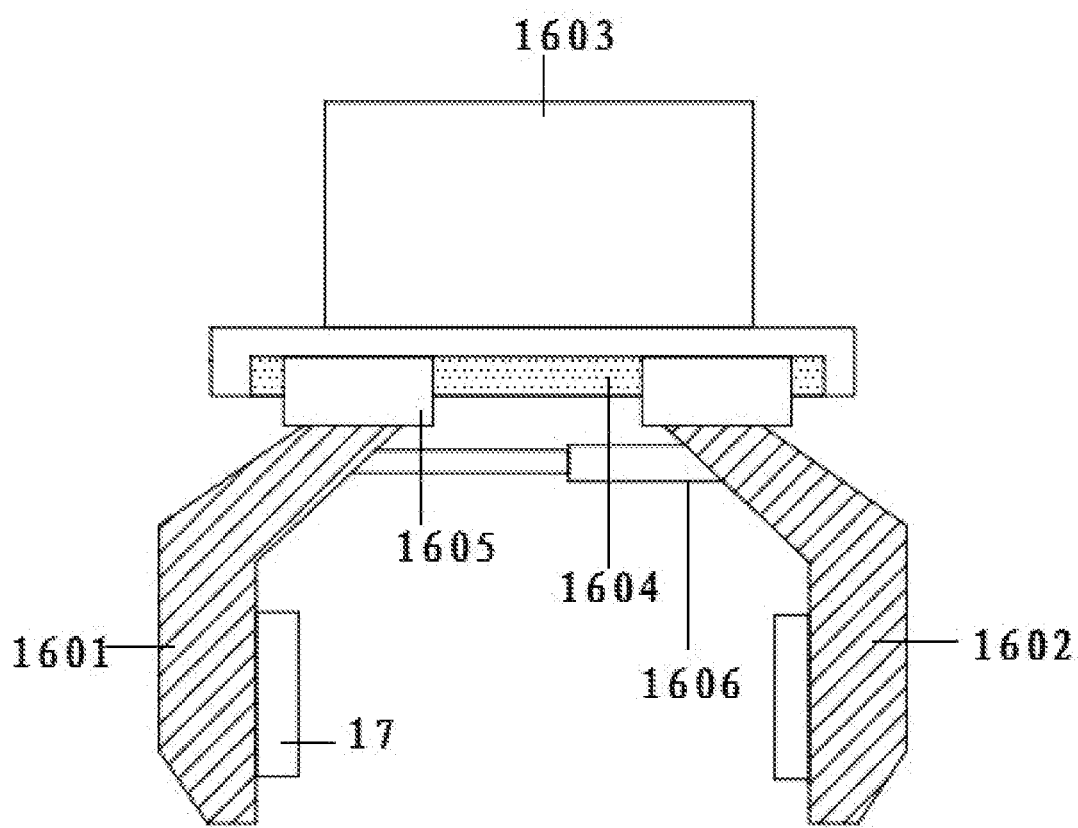
FIG. 2 is a schematic structural diagram of a rescue clamping mechanism of the present disclosure.

As shown in FIG. 1, the present disclosure is a rescue robot for searching trapped persons for firefighting, including a mobile base 1. Mobile rollers 2 with self-locking mechanisms are mounted at a bottom of the mobile base 1. A machine mounting seat 3 is fixed to the mobile base 1. A rotating column 4 is arranged at the middle of a top of the machine mounting seat 3. A driving motor 5 is mounted at a bottom of an inner cavity of the machine mounting seat 3. A right output end of the driving motor 5 is sleeved with a driving bevel gear 6. A bottom of the rotating column 4 penetrates through a top of the machine mounting seat 3 and is sleeved with a driven bevel gear 7. The driving bevel gear 6 and the driven bevel gear 7 are mutually meshed. A portion of an outer wall of the rotating column 4 above the machine mounting seat 3 is fixedly sleeved with a fixed seat 8. Left and right sides of the fixed seat 8 are symmetrical bridge cranes 9. Rotating shaft seats 10 are mounted at one sides of the two sets of bridge cranes 9 that are far away from each other. First power arms 11 are mounted on the other sides of the two sets of rotating shaft seats 10. Second power arms 12 are rotatably connected to the other sides of the two sets of first power arms 11 through rotating bearings. First hydraulic telescopic rods 13 are fixed to bottom side walls of the second power arms 12. The other ends of the first hydraulic telescopic rods 13 abut against and fixed to the rotating shaft seats 10. Hoisting booms 14 are rotatably connected to the other ends of the second power arms 12 through rotating bearings. Second hydraulic telescopic rods 15 are fixed to top side walls of the hoisting booms. The other ends of the second hydraulic telescopic rods 15 are fixed to top side walls of the second power arms 12. Rescue clamping mechanisms 16 are fixed to the hoisting booms 14.

The rescue clamping mechanism 16 includes a first rescue gripper 1601 and a second rescue gripper 1602. A gripper mounting seat 1603 is mounted at tops of the first rescue gripper 1601 and the second rescue gripper 1602. A top of the gripper mounting seat 1603 is fixedly connected to a bottom of the hoisting boom 14. A sliding groove 1604 is arranged at a bottom of the gripper mounting seat 1603. A mobile slider 1605 slidably connected to the sliding groove 1604 is fixed to the tops of the first rescue gripper 1601 and the second rescue gripper 1602. The first rescue gripper 1601 and the second rescue gripper 1602 are fixedly connected to each other through a third hydraulic telescopic rod 1606. Opposite end side walls of the first rescue gripper 1601 and the second rescue gripper 1602 are sleeved with non-slip rubber spacers 17. A water tank 18 is fixed to a top of the machine mounting seat 3 and located at a right side of the rotating column 4. A water guiding hose 19 is inserted into and communicated with a bottom of a right end side wall of the water tank 18. The other end of the water guiding hose 19 is sleeved with a spray head 20. A water stop valve 21 and a water pump 22 are mounted on the water guiding hose 19 respectively. A protective baffle 23 is fixed to a top of the rotating column 4.

A specific application of this embodiment is as follows: when the rescue robot for searching trapped persons for firefighting is used, first the rescue robot is moved to a designated rescue location through the mobile rollers 2. When carrying stones or beam columns, the driving motor 5 is started. The driving motor 5 drives the driving bevel gear 6 to rotate. Due to the fact that the driving bevel gear 6 and the driven bevel gear 7 are mutually meshed, the rotating column 4 is then driven by the driven bevel gear 6 to adjust the angle and the direction of the rescue clamping mechanism 16 to adjust the rescue clamping mechanism to the direction the same as a desired place. Afterwards, the angles and the positions of the first power arm and the second power arm 12 are adjusted by the first hydraulic telescopic rod 13 and the second hydraulic telescopic rod 15, and then the rescue clamping mechanism 16 is driven to lower and move by the hosting boom 14 at the bottom, so that the stones or beam columns to be carried are located between the first rescue gripper 1601 and the second rescue gripper 1602. The third hydraulic telescopic rod 1606 is controlled to cause the first rescue gripper 1601 and the second rescue gripper 1602 at left and right sides thereof to close to each other to clamp and fix the stones and beam columns above a trapped person, and then the first power arm and the second power arm 12 are driven by the first hydraulic telescopic rod 13 and the second hydraulic telescopic rod 15 to carry the stones and beam columns away. If there is still an open fire burning in the trapped area, the water stop valve 21 is opened, the water pump 22 is started, and the spray head 20 is directed at a burning point to spray and extinguish the fire to prevent the fire from spreading further. [24] In the descriptions of this specification, the descriptions with reference to the terms "an embodiment," "example," "specific example," and the like means that the specific features, structures, materials or characteristics described in conjunction with the embodiment or example are included in at least one embodiment or example of the present disclosure. In this specification, the schematic statements of the above-mentioned terms do not necessarily refer to the same embodiment or example. Moreover, the specific features, structures, materials or characteristics described can be combined in any one or more embodiments or examples in a suitable manner.

The preferred embodiments of the present disclosure disclosed above are only used to help illustrate the present disclosure. The preferred embodiments neither exhaustively describe all the details, nor limit the present disclosure to only the specific embodiments described. Obviously, many modifications and changes can be made according to the content of this specification. These embodiments selected and specifically described in this specification are used to better explain the principles and practical applications of the present disclosure, so that those skilled in the art can understand and use the present disclosure well. The present disclosure is only limited by the claims and full scope and equivalents thereof.

What is claimed is:

1. A rescue robot for searching trapped persons for firefighting, comprising a mobile base (1), wherein mobile rollers (2) with self-locking mechanisms are mounted at a bottom of the mobile base (1), a machine mounting seat (3) is fixed to the mobile base (1), a rotating column (4) is arranged at the middle of a top of the machine mounting seat (3), a driving motor (5) is mounted at a bottom of an inner cavity of the machine mounting seat (3), a right output end of the driving motor (5) is sleeved with a driving bevel gear (6), a bottom of the rotating column (4) penetrates through a top of the machine mounting seat (3) and is sleeved with a driven bevel gear (7), the driving bevel gear (6) and the driven bevel gear (7) are mutually meshed, a portion of an outer wall of the rotating column (4) above the machine mounting seat (3) is fixedly sleeved with a fixed seat (8), left and right sides of the fixed seat (8) are symmetrical bridge cranes (9), rotating shaft seats (10) are mounted at one sides of the two sets of bridge cranes (9) that are far away from each other, first power arms (11) are mounted on the other sides of the two sets of rotating shaft seats (10), second power arms are rotatably connected to the other sides of the two sets of first power arms (11) through rotating bearings (12), first hydraulic telescopic rods (13) are fixed to bottom side walls of the second power arms (12), the other ends of the first hydraulic telescopic rods (13) abut against and fixed to the rotating shaft seats (10), hoisting booms (14) are rotatably connected to the other ends of the second power arms (12) through rotating bearings, second hydraulic telescopic rods (15) are fixed to top side walls of the hoisting booms (14), the other ends of the second hydraulic telescopic rods (15) are fixed to top side walls of the second power arms (12), and rescue clamping mechanisms (16) are fixed to the hoisting booms (14).

2. The rescue robot for searching trapped persons for firefighting according to claim 1, wherein the rescue clamping mechanism (16) comprises a first rescue gripper (1601) and a second rescue gripper (1602), a gripper mounting seat (1603) is mounted on tops of the first rescue gripper (1601) and the second rescue gripper (1602), a top of the gripper mounting seat (1603) is fixedly connected to a bottom of the hoisting boom (14), a sliding groove (1604) is arranged at a bottom of the gripper mounting seat (1603), a mobile slider (1605) slidably connected to the sliding groove (1604) is fixed to the tops of the first rescue gripper (1601) and the second rescue gripper (1602), and the first rescue gripper (1601) and the second rescue gripper (1602) are fixedly connected to each other through a third hydraulic telescopic rod (1606).

3. The rescue robot for searching trapped persons for firefighting according to claim 2, wherein opposite end side walls of the first rescue gripper (1601) and the second rescue gripper (1602) are sleeved with non-slip rubber spacers (17).

4. The rescue robot for searching trapped persons for firefighting according to claim 1, wherein a water tank (18) is fixed to a top of the machine mounting seat (3) and located at a right side of the rotating column (4), a water guiding hose (19) is inserted into and communicated with a bottom of a right end side wall of the water tank (18), the other end of the water guiding hose (19) is sleeved with a spray head (20), and a water stop valve (21) and a water pump (22) are mounted on the water guiding hose (19) respectively.

5. The rescue robot for searching trapped persons for firefighting using the rescue robot according to claim 1, wherein a protective baffle (23) is fixed to a top of the rotating column (4).

6. A rescue method for searching trapped persons for firefighting according to claim 1, comprising:
   step S1: first moving a rescue robot to a designated rescue location through the mobile roller (2);
   step S2: when carrying stones or beam columns, starting a driving motor (5), wherein the driving motor (5) drives a driving bevel gear (6) to rotate, due to the fact that the driving bevel gear (6) and a driven bevel gear (7) are mutually meshed, a rotating column (4) is then driven by the driven bevel gear (6) to adjust an angle and a direction of a rescue clamping mechanism (16) to adjust the rescue clamping mechanism to the direction the same as a desired place, afterwards, angles and positions of a first power arm and a second power arm (12) are adjusted by a first hydraulic telescopic rod (12) and by a second hydraulic telescopic rod (13), then the rescue clamping mechanism (16) is driven to lower and move by a hosting boom (14) at the bottom, so that stones or beam columns to be carried are located between a first rescue gripper (1601) and a second rescue gripper (1602), a third hydraulic telescopic rod (1606) is controlled to cause the first rescue gripper (1601) and the second rescue gripper (1602) at left and right sides thereof to close to each other to clamp and fix the stones and beam columns above a trapped person, and then the first power arm and the second power arm (12) are driven by the first hydraulic telescopic rod (13) and the second hydraulic telescopic rod (15) to carry the stones and beam columns away; and
   step S3: if there is still an open fire burning in a trapped area, opening a water stop valve (21), starting a water pump (22), and directing a spray head (20) at a burning point to spray and extinguish the fire to prevent the fire from spreading further.

* * * * *